Aug. 9, 1938.　　　W. W. MACFARREN　　　2,125,939
ROTARY SHEAR KNIFE
Filed Jan. 18, 1937

OLD FORM

INVENTOR.
Walter W. Macfarren

Patented Aug. 9, 1938

2,125,939

UNITED STATES PATENT OFFICE 2,125,939

ROTARY SHEAR KNIFE

Walter W. Macfarren, Los Angeles, Calif.

Application January 18, 1937, Serial No. 121,130

16 Claims. (Cl. 164—66)

My invention relates to shear knives such as are used on rotary shears. The principal object of my invention is to provide such knives with a "raked" cutting edge, to reduce the cutting stresses and shocks on the machine by making a more or less gradual cut. This is common practice with reciprocating shears, but has heretofore been impossible with rotary shears for reasons to follow.

The knives herein described are suitable for any style of rotary drum type shear, in which each of a pair of coacting knives is carried by one of a pair of rotary drums, these drums being parallel and connected by gearing. Such shears are shown in my previous Patents Nos. 1,849,501, and 1,965,523, and in Patent No. 1,031,056 to Edwards. A rotary shear with raked knives, but having a complicated linkage with many operating joints to support the knives, instead of the two simple knife carrying drums illustrated herein is shown in the patent to Talbot No. 1,973,515, and helical shear knives are shown in the patent to Maier No. 1,718,570.

Raked knives are especially desirable for shearing strip steel, which is comparatively thin, but is now rolled in widths up to 72" or more, so that with parallel knives the cutting stresses may be high. All the drawings are diagrammatic only.

Figure 1:
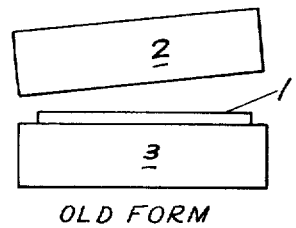
Fig. 1 shows raked knives as used for reciprocating shears.

In Fig. 1, the upper movable raked knife 2 coacts vertically with the lower stationary level knife 3 to shear the bar 1, the cut starting at the left edge of the bar, and progressing to the right edge, in the well known manner.

As only a portion of the whole section of the bar is being sheared at any given moment, the maximum stress on the shear is less than if the knives 2 and 3 were parallel.

Figure 2:
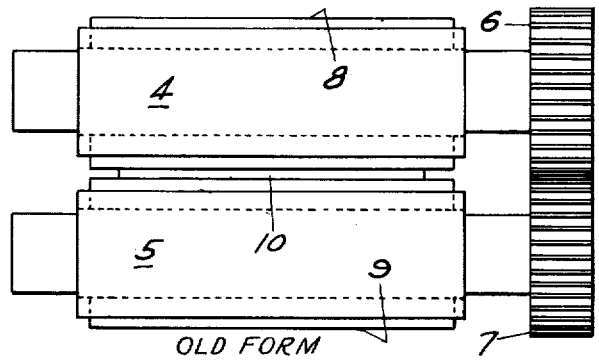
Fig. 2 shows a drum type shear with the usual parallel knives.

In Fig. 2, the parallel rotary drums 4 and 5, are connected by spur gears 6 and 7, and supported and driven in any convenient manner. Each drum 4 and 5 carries one or more parallel shear knives 8 or 9, which coact in pairs to shear the bar 10, the knives 8 and 9 simultaneously engaging the whole width of the bar, and thus requiring the maximum cutting force at the start of the cut.

If the bar or strip 10 is wide, and the shear drums 4 and 5 rotate at high speed, the initial shock on the knives, and on their supporting and driving connections may be high, which requires a shear heavy enough to safely carry the maximum stresses.

Figures 4, 5, 6, 7:
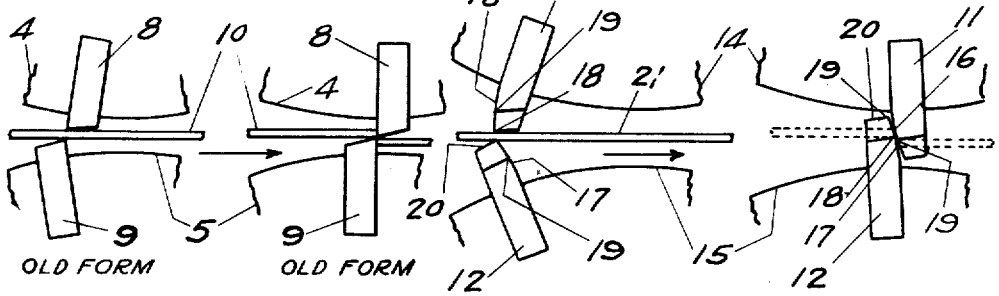
Fig. 4 shows a pair of parallel knives at the start of a cut.
Fig. 5 shows the same knives at the end of the cut.
Fig. 6 is an end view of a pair of raked knives according to my invention at the start of a cut.
Fig. 7 is a similar view of the raked knives at the end of the cut.

Also it will be noted, that with knives similar in cross section to those shown in Figs. 4 and 5, it is not possible to rake the knives, since to do so would not only produce interference between the knives, but aside from this, the cut made on the bar 10 would not be square with its length, which is usually essential.

If the knife edges are parallel, and set square with the length of the bar, as pre-supported in Figs. 2, 4, and 5, the cut will be square. However, if one or both knives were raked, at the start of the cut that portion of the knife edge farthest from the center of rotation (i. e. longest radius) would engage the bar 10 first, and since the bar and the knives are moving from left to right, the least radius of the knife would not engage the bar until the same had moved some distance to the right, and thus the cut would be out of square with the bar.

Figure 3:
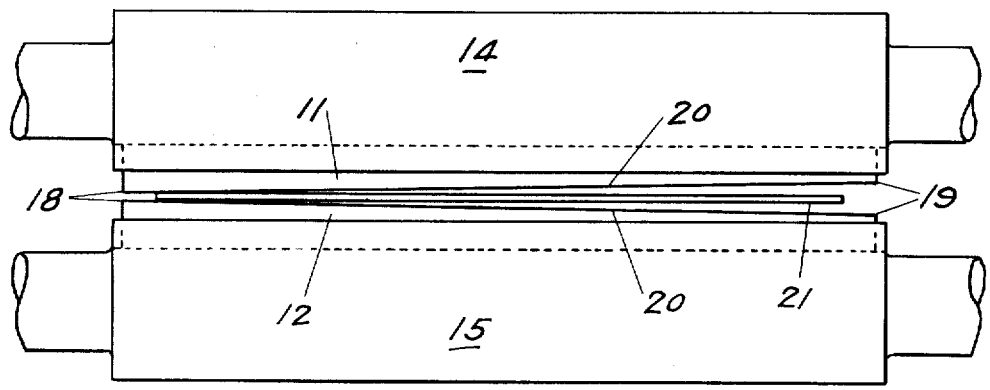
Fig. 3 shows a drum type shear with raked knives.

However, if the cutting faces of the knives be given the shape of involute curves like a pair of mating gear teeth, the knives may be raked, and the cut will be square with the bar or strip. Referring to Figs. 3, 6, and 7, the upper knife 11 and the lower knife 12, may be mounted respectively on the upper and lower drums 14 and 15, and may be duplicates of each other.

These knives 11 and 12 may be secured to their drums in any usual or convenient manner, such details being well known in the art. A gear tooth curve 16 is formed on the knife 11, and a similar curve 17 is formed on the knife 12. These curves may be milled at one operation by clamping a pair of knives together. These faces may be cut with standard milling cutters exactly as if the knives 11 and 12 were integral with the drums 14 and 15, so that they rotate in close relation but with a desired small working clearance, this registry being maintained by gears such as 6 and 7 of Fig. 2, or other desired and efficient arrangement of gears.

The knives 11 and 12 may both be raked as shown in Fig. 3, the cut starting at the left or "high" end 18 of the knives, and terminating at the right or "low" end 19 of the same. In Figs. 4 and 5, it will be readily understood that the whole length of the cutting corners of the knives 8 and 9, lie approximately on the pitch circle of the gears 6 and 7. For thin material they may each have a radius of swing a little larger than this circle, so that the knife edges pass each other a slight amount radially.

For comparatively thick material, especially if cut cold, the knife cutting corners may have a radius somewhat less than the pitch radius, as the material may be severed when the knives have cut about two thirds of its thickness. The same conditions apply to the construction of Figs. 3, 6, and 7, with respect to the "low" end 19 of the knives.

The high end 18 of the knives may project any reasonable amount for rake, beyond the pitch circle, just as the addendum of a gear tooth does. After the tooth curves 16 and 17 are formed on the knives 11 and 12, (or before) the knife edge or top 20 may be planed or milled to the desired angle of rake, it being preferable however that the points 18 and 19 are within the addendum of a standard gear tooth of the pitch selected, this pitch being determined by the amount of rake desired. By raking both the upper and lower knives 11 and 12, the same effect is obtained as with twice the angle of rake on a single knife, and this permits of sufficient rake being obtained on a wide shear to be of substantial benefit on stock not too thick.

From Figs. 6 and 7, it will be seen that the high corners 18 of the knives 11 and 12 engage the stock first, and as the stock 21 moves toward the right, the low corners 19 of the knives also move toward the right at substantially the same speed, so that the cut is substantially square with the length of the stock.

This can be seen by considering that a square end bar could be fed against the face 16 as the knife 11 rotated with its drum, and the end of the bar would be in continuous contact with the face 16, just like a rack tooth. It has been assumed that the knife edges 20 may be straight lines as shown, but if necessary or desirable they may be slightly curved either concave or convex; or if desired the tooth surfaces 16 and 17 may be slightly helical.

Figure 9:
Fig. 9 shows a modified form of shear knife having two raked cutting edges.

Fig. 9 shows an end view of a modified form of shear knife 12a, which has a gear tooth curve 24 on one side, and a similar gear tooth curve 25 on the other side, thus providing two usable raked cutting edges.

Those who wish to compare the present invention with some of the prior art, are referred to the patents to Maier 1,718,570, Edwards 1,031,056, and Talbot 1,973,515.

The present invention adds to the general excellence of rotary drum type shears by providing shear knives of novel shape which are suitable for the rotary movement of the drums and knives, and which provide the well known advantages of raked knives.

Figure 8:
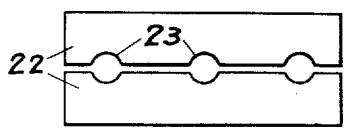
Fig. 8 shows notched rotary shear knives for cutting round bars.

In Fig. 8, I have shown a pair of coacting knives 22, having coacting notches 23, for shearing round bars. These knives may have a section similar to that shown in Figs. 6 and 7, the bottoms of the notches 23 lying about on the knife pitch circle. It will be noted that the shear knives herein described are suitable with proper detail design, for practically any style or construction of a rotary drum type shear. They are equally suitable for a shear such as shown by Edwards 1,031,056, in which one drum is moved toward the other to make a cut, or to the shear of my pending application Ser. No. 83,174, in which the knives are rigidly attached to the drums; or to the shear of my Patent 1,849,501, in which some of the knives are radially adjustable and others are fixed, the drums being mounted on fixed centers.

The cutting edge of a shear knife may be square, as is usual for heavy cutting, or beveled as shown in Fig. 5. A beveled edge is an edge at an angle less than a right angle to the cutting side of the knife.

A rake is a taper of the knife longitudinally as shown in Fig. 3, or a setting of the knife on the shear to produce a similar cutting action, as shown in Fig. 1. It is often more convenient to make the knives without a taper, as shown in Fig. 1, and then to set one or both of them on the shear in such a way as to produce a "raking cut," or a cut acting progressively from one side of the material to the other.

If the knife itself is called a raked knife, it is tapered longitudinally, but a shear may be described as having its knives "raked" when they are so set in relation to each other as to make a raking cut.

Having now described the present invention in sufficient detail so that those skilled in the art may understand and apply it, I claim as my invention:

1. In a rotary drum type shear, the combination of a pair of rotary knife carrying drums mounted on fixed centers and geared together, and a pair of coacting raked shear knives, one of said knives being mounted on each of said drums and so arranged that the coacting edges of said knives operate in the necessary close relation to each other, to make clean cuts.

2. In a rotary drum type shear, the combination of a pair of parallel rotary knife carrying drums connected for opposite simultaneous rotation, a raked shear knife mounted on one of the said drums, and a coacting knife mounted on the other drum and so arranged that the coacting edges of said knives operate in the necessary close relation to each other, to make clean cuts.

3. In a rotary drum type shear, the combination of a pair of parallel rotary knife carrying drums connected for opposite simultaneous rotation, a raked shear knife mounted on one of the said drums, and a raked coacting knife mounted on the other drum.

4. In a rotary drum type shear, the combination of a pair of rotary knife carrying drums mounted on fixed centers and geared together, a shear knife mounted on one of the drums and having the outer portion of one of its sides in the form of a curved surface, a cutting corner formed by the intersection of the said curved surface with the outer edge of the knife, and a similar shear knife mounted on the other drum and in coacting relation to the first knife.

5. In a rotary drum type shear, the combination of a pair of rotary knife carrying drums connected for opposite simultaneous rotation, a shear knife mounted on one of the drums and having the outer portion of one of its sides formed in the contour of a gear tooth, a cutting corner formed by the intersection of the said tooth curve with the edge of the knife, and a similar shear knife mounted in coacting relation to the first, on the other drum.

6. In a rotary drum type shear, the combination of a pair of rotary knife carrying drums connected for opposite simultaneous rotation and set square with the path of a moving bar to be sheared, and means for making square transverse cuts on a bar passed between the drums, the said cuts starting at one edge of the stock, and progressing across its width, while the stock is moving through the shear, said cutting means comprising a pair of coacting shear knives, whose cutting edges operate in the necessary close relation to each other, to make clean cuts.

7. In a rotary drum type shear, the combination of a pair of rotary knife carrying drums connected for opposite simultaneous rotation, a shear knife mounted on one of the drums and having the outer portion of one of its sides cut away to form one side of a gear tooth, the outer edge of the said knife being tapered or raked, a cutting corner formed by the intersection of the said tooth curve and the said tapered outer edge, and a similar shear knife mounted in coacting relation to the first, on the other drum.

8. In a rotary drum type shear, the combination of a pair of rotary knife carrying drums connected for opposite simultaneous rotation, a shear knife mounted on one of the drums and having the outer portion of one of its sides cut away to form one side of a gear tooth, the same being slightly helical with the axis of the drum, the outer edge of the said knife being tapered or raked, a cutting corner formed by the intersection of the said tooth curve and the said tapered outer edge, and a similar shear knife mounted in coacting relation to the first, on the other drum.

9. A shear knife for rotary drum type shears comprising an elongated flat blade having the outer portion of one of its sides cut away to form a curved surface, and a cutting corner formed by the intersection of the said curved surface with the edge of the knife, to coact with a knife of similar form.

10. A shear knife for rotary drum type shears comprising an elongated flat blade having the outer portion of one of its sides cut away to form one side of a gear tooth, and a cutting corner formed by the intersection of the said tooth curve with the edge of the knife.

11. A shear knife for rotary drum type shears comprising an elongated flat blade having the outer portion of one of its sides cut away to form one side of a gear tooth, and a cutting corner formed by the intersection of the said tooth curve with the edge of the knife, and the said knife edge being tapered longitudinally so that the said cutting corner lies on the surface of the tooth curve, and at a slight angle to the axis of rotation of the knife.

12. A shear knife for rotary drum type shears comprising an elongated flat blade having the outer portion of one of its sides cut away to form one side of a gear tooth, and a raked cutting edge formed at the top of the said tooth and lying within the addendum of the said tooth.

13. A shear knife for rotary drum type shears, comprising an elongated flat blade having one side of an involute gear tooth formed at one of its corners, and parallel with its length, a rake or longitudinal taper formed on the adjacent edge of the blade, the said tapered edge being also beveled at an angle to the plane of the blade, thus forming a cutting corner at the intersection of the gear tooth surface and the said raked and beveled edge, to coact with a shear knife or similar form.

14. A shear knife for rotary drum type shears having a gear tooth contour at one of its outer corners, and a raked outer edge, thus forming a cutting corner at the intersection of the said tooth surface with the said raked outer edge.

15. In a rotary drum type shear, the combination of a pair of rotary knife carrying drums connected for opposite simultaneous rotation, and adapted to shear a piece of stock passed between them in a direction perpendicular to their axes of rotation, means for starting a cut at one side of the stock, the said cut moving progressively across the stock as the stock moves forward, and means whereby the said cut is square with the stock.

16. A shear knife for rotary drum type shears, having a gear tooth contour formed at each of two adjacent outer corners, and a raked outer edge, thus forming a pair of interchangeable cutting corners at the intersections of the said outer edge with the two adjacent tooth contours.

WALTER W. MACFARREN.

---

CERTIFICATE OF CORRECTION.

Patent No. 2,125,939. August 9, 1938.

WALTER W. MACFARREN.

It is hereby certified that error appears in the printed specification of the above numbered patent requiring correction as follows: Page 1, second column, line 24, for "pre-supported" read pre-supposed; page 3, second column, line 27, claim 13, for "or" read of; and that the said Letters Patent should be read with this correction therein that the same may conform to the record of the case in the Patent Office.

Signed and sealed this 15th day of November, A. D. 1938.

Henry Van Arsdale

Acting Commissioner of Patents.

(Seal)

curve with the edge of the knife, and a similar shear knife mounted in coacting relation to the first, on the other drum.

6. In a rotary drum type shear, the combination of a pair of rotary knife carrying drums connected for opposite simultaneous rotation and set square with the path of a moving bar to be sheared, and means for making square transverse cuts on a bar passed between the drums, the said cuts starting at one edge of the stock, and progressing across its width, while the stock is moving through the shear, said cutting means comprising a pair of coacting shear knives, whose cutting edges operate in the necessary close relation to each other, to make clean cuts.

7. In a rotary drum type shear, the combination of a pair of rotary knife carrying drums connected for opposite simultaneous rotation, a shear knife mounted on one of the drums and having the outer portion of one of its sides cut away to form one side of a gear tooth, the outer edge of the said knife being tapered or raked, a cutting corner formed by the intersection of the said tooth curve and the said tapered outer edge, and a similar shear knife mounted in coacting relation to the first, on the other drum.

8. In a rotary drum type shear, the combination of a pair of rotary knife carrying drums connected for opposite simultaneous rotation, a shear knife mounted on one of the drums and having the outer portion of one of its sides cut away to form one side of a gear tooth, the same being slightly helical with the axis of the drum, the outer edge of the said knife being tapered or raked, a cutting corner formed by the intersection of the said tooth curve and the said tapered outer edge, and a similar shear knife mounted in coacting relation to the first, on the other drum.

9. A shear knife for rotary drum type shears comprising an elongated flat blade having the outer portion of one of its sides cut away to form a curved surface, and a cutting corner formed by the intersection of the said curved surface with the edge of the knife, to coact with a knife of similar form.

10. A shear knife for rotary drum type shears comprising an elongated flat blade having the outer portion of one of its sides cut away to form one side of a gear tooth, and a cutting corner formed by the intersection of the said tooth curve with the edge of the knife.

11. A shear knife for rotary drum type shears comprising an elongated flat blade having the outer portion of one of its sides cut away to form one side of a gear tooth, and a cutting corner formed by the intersection of the said tooth curve with the edge of the knife, and the said knife edge being tapered longitudinally so that the said cutting corner lies on the surface of the tooth curve, and at a slight angle to the axis of rotation of the knife.

12. A shear knife for rotary drum type shears comprising an elongated flat blade having the outer portion of one of its sides cut away to form one side of a gear tooth, and a raked cutting edge formed at the top of the said tooth and lying within the addendum of the said tooth.

13. A shear knife for rotary drum type shears, comprising an elongated flat blade having one side of an involute gear tooth formed at one of its corners, and parallel with its length, a rake or longitudinal taper formed on the adjacent edge of the blade, the said tapered edge being also beveled at an angle to the plane of the blade, thus forming a cutting corner at the intersection of the gear tooth surface and the said raked and beveled edge, to coact with a shear knife or similar form.

14. A shear knife for rotary drum type shears having a gear tooth contour at one of its outer corners, and a raked outer edge, thus forming a cutting corner at the intersection of the said tooth surface with the said raked outer edge.

15. In a rotary drum type shear, the combination of a pair of rotary knife carrying drums connected for opposite simultaneous rotation, and adapted to shear a piece of stock passed between them in a direction perpendicular to their axes of rotation, means for starting a cut at one side of the stock, the said cut moving progressively across the stock as the stock moves forward, and means whereby the said cut is square with the stock.

16. A shear knife for rotary drum type shears, having a gear tooth contour formed at each of two adjacent outer corners, and a raked outer edge, thus forming a pair of interchangeable cutting corners at the intersections of the said outer edge with the two adjacent tooth contours.

WALTER W. MACFARREN.

---

CERTIFICATE OF CORRECTION.

Patent No. 2,125,939.  August 9, 1938.

WALTER W. MACFARREN.

It is hereby certified that error appears in the printed specification of the above numbered patent requiring correction as follows: Page 1, second column, line 24, for "pre-supported" read pre-supposed; page 3, second column, line 27, claim 13, for "or" read of; and that the said Letters Patent should be read with this correction therein that the same may conform to the record of the case in the Patent Office.

Signed and sealed this 15th day of November, A. D. 1938.

Henry Van Arsdale

Acting Commissioner of Patents.

(Seal)